Figures 1, 2:
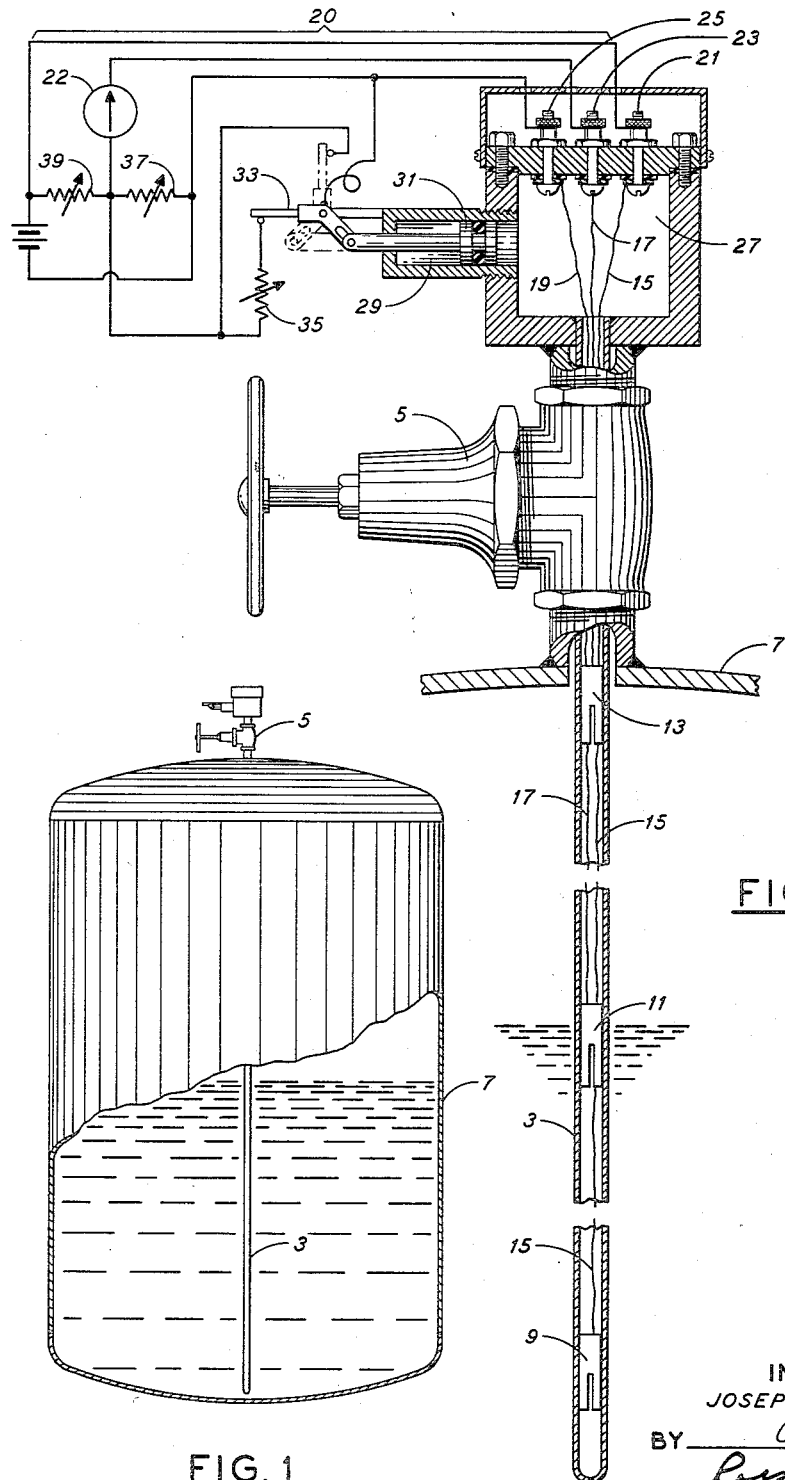

Aug. 19, 1958 J. F. CHITTUM 2,848,682
TUBULAR RESISTANCE COUPON
Filed May 21, 1956

INVENTOR
JOSEPH F. CHITTUM
BY
ATTORNEYS

Patented Aug. 19, 1958

2,848,682

TUBULAR RESISTANCE COUPON

Joseph F. Chittum, Whittier, Calif., assignor to California Research Corporation, San Francisco, Calif., a corporation of Delaware Application May 21, 1956, Serial No. 586,245

5 Claims. (Cl. 324—65)

My invention relates to a resistance coupon and particularly to one which measures pitting rate, corrosion rate and the sharpness of pitting.

In the operation of natural gasoline plants and other chemical apparatus, corrosion of the various vessels has been found to be a severe problem. The operator desires to replace the pressure vessels and other equipment before corrosion has caused the operation to be dangerous. The rate of corrosion however, is not a completely predictable phenomenon and it is difficult to establish a replacement program which permits the operator to derive substantially the full use from a pressure vessel and yet regularly replace the vessel before it is sufficiently damaged by corrosion to require emergency repairs.

One method of performing this function would be to remove the pressure vessels from the line at regular intervals and examine their internal surfaces in order to be constantly informed as to the extent of corrosion and the approximate time at which the pressure vessel should be renewed. While such a practice can be made to serve its purpose, it is expensive and inconvenient. Accordingly, operators tend to inspect their pressure vessels only at the rarest intervals and thereby to incur frequently the additional expense of making emergency repairs.

In apparatus according to my invention, a long metal tubular member is placed within the pressure vessel. At a number of points on the inside of the metal tubular member are electrical contacts, to which are connected electrical leads which are connected to terminals outside of the pressure vessel. By connecting resistance measuring apparatus between these terminals, the operator may measure the resistance of the metal tubular member between the electrical contacts. As the tubular member corrodes, its resistance increases and the external measurements of resistance are an indication of the extent of corrosion of the tubular member. The tubular member is closed at its end within the pressure vessel and provides a passageway to a pressure indicator external to the pressure vessel. When corrosive pitting perforates the tubular member, the pressure within the member increases, causing the pressure indicator to indicate an increase in pressure within the tubular member.

As the tubular member within the pressure vessel is provided with a number of electrical contacts, the operator is enabled to measure the rate of corrosion of metal submerged within the liquid in the pressure vessel by measuring resistance between one or more pairs of electrical terminals connected to contacts in the submerged portion of the tube while he measures corrosion due to gases in the upper portion of the pressure vessel by measuring resistance between pairs of terminals for contacts which are located above the surface of the liquid. By measuring rate of change in one of these resistances he measures a rate of general corrosion. Since the rate of pitting is not determinable from the rate of general corrosion, he employs his pressure indicator to let him know when pitting has advanced sufficiently to perforate the tubular member. In order to determine the sharpness of pitting, he relates the rate of general corrosion to the rate of perforation of the tube and thereby obtains an indication of the degree to which metal loss is localized on the walls of the pressure vessel. This knowledge of the sharpness of pitting enables the operator to judge the frequency of failures that make necessary the repairing of the pressure vessel, a factor not obtainable from any measure of general corrosion.

The novel features of my invention are set forth with more particularity in the accompanying claims. The invention itself, however, with respect to the details thereof, together with its additional objects and advantages, may be better understood from the following description of a specific embodiment with reference to the accompanying drawings, in which:

Fig. 1 shows a pressure vessel containing a resistance coupon according to my invention; and Fig. 2 shows in more detail a tubular coupon according to my invention.

As shown in the drawings, the tubular member 3 passes through the valve 5 into the pressure vessel 7. The number of contacts 9, 11 and 13 are in intimate contact with the inner surface of the tubular member 3. Electrical conductors 15, 17 and 19 lead from the respective contacts 9, 11 and 13 to terminals 21, 23 and 25 external to the pressure vessel 7. The lower end of the tubular member 3 is closed and the upper end opens into a pressure chamber 27 leading to a cylinder 29 in which there is a piston 31.

My resistance coupon is immersed in the liquid within the pressure vessel 7. For purposes of illustration, we might say that contact 9 is selected to be below the surface of the liquid, the contact 11 at the surface of the liquid and the contact 13 in the gaseous atmosphere above the liquid. Resistance measuring apparatus including Wheatstone bridge 20 is connected between the terminals 21 and 23 to measure the resistance of the metal tubular member 3 between the contacts 9 and 11. This measurement is indicated by meter 22 and periodically recorded so that the rate of change of resistance between the terminals 21 and 23 is determined. Insulated conductors 15 and 17 have a low resistance, thus permitting the measurement to indicate the resistance of the tubular member. As corrosion removes metal from the member 3, the resistance between the contacts 9 and 11 increases and the externally measured resistance between the contacts 21 and 23 is a measure of the corrosion due to the liquid.

Similar resistance measurements are made between the terminals 23 and 25 to determine the rate of corrosion of the upper portion of the tubular member, this corrosion being due to the action of the gaseous atmosphere. These resistance measurements indicate general corrosion, that is, corrosion which is substantially uniform over the entire area of the tubular member which is subjected to contact with the same fluid.

The action of corrosion is not uniform and small holes are formed in the walls of the pressure vessel 7 and of the tubular member 3. This is termed pitting. When pitting of the tubular member 3 advances to the point that the wall of the tubular member 3 is perforated, the gases and liquids within the pressure vessel 7 leak into the tubular member 3, raising the pressure within it. There is an open channel from the tubular member 3 to the pressure chamber 27. When the pressure within the tubular member increases, due to perforation, the pressure within the pressure chamber 27 and the cylinder 29 increases and the piston 31 is forced outward, moving switch 33 from a horizontal to a vertical position. This change in positions of the switch 33 is an indication that perforation of the tubular member 3 has taken place and indicates that pitting of the walls of the pressure vessel is also progressing. In the position illustrated, switch 33 connects variable resistor 35 in parallel with resistor 37 when the tubular member 3 is not perforated. When tubular member 3 is perforated and its internal pressure increases, switch 33 shorts out resistor 37 to modify current flow in bridge 20 and change the reading on meter 22.

Thus, I have provided a means for measuring the general corrosion rate and the pitting rate. The resistance between the various contacts can be measured and recorded continuously or periodically and the values of resistance plotted on a graph. If there is no pitting while corrosion continues, the tubular member 3 will become perforated due to general corrosion, thus the graph of increase in resistance will show an increasing amount of corrosion over a protracted period of time before perforation of the tubular member 3 takes place. Alternatively, certain types of chemicals pit at a rapid rate and the tubular member 3 may be perforated long before it has corroded sufficiently to become thin-walled. Perforations in the latter case will be the result of deep narrow holes in the tubular member 3 and in the walls of the pressure vessel 7. By "sharpness of pitting" I designate the relationship between general corrosion and pitting rate. The pitting is sharper as perforation comes earlier in the corrosion process.

Information as to sharpness of pitting is important to the operator of a plant inasmuch as he knows in the case of sharp pitting that he will have frequent failures resulting from small holes. As an alternative, if pitting is less sharp, he realizes that any corrosion is an indication of general deterioration of the wall of the pressure vessel.

In order to cause the indications of general corrosion and pitting to be directly indicative of the action of liquids and gases on the wall of the pressure vessel, the tubular member 3 may be made of the same material as that of the wall of the pressure vessel 7. Alternatively, the tubular member 3 may be made of a different material which corrodes more or less readily than the wall of the pressure vessel 7. As the tubular member corrodes more rapidly, it provides an earlier indication of pitting and a graph of general corrosion which has a more easily readable slope. By making a tubular member 3 of a material which corrodes more slowly than the walls of the pressure vessel 7, the operator can use a thin-walled tube for the member 3 and at the same time have a surface which will perforate or corrode in about the same time as the wall of the pressure vessel 7.

While I have described my invention with reference to a specific embodiment thereof, I am aware that many modifications thereof can be made without departing from my invention. I do not intend therefore, to limit myself except as set forth in the appended claims.

I claim:

1. Apparatus for measuring the corrosion rate in a metal container containing a fluid comprising an elongated metal tube projecting into said container and exposed to said fluid, a closed end on said tube to exclude said fluid from the interior thereof, a plurality of electrical contacts placed in electrically conducting relationship with the interior wall of said tube and in spaced-apart relationship to each other, insulated conductors extending from said plurality of electrical contacts on the inside of said tube to terminals external to said container, and means for measuring the electrical resistance between said terminals.

2. The combination of claim 1 in which said metal tube is composed of the same metal as the container.

3. Apparatus for measuring the rate of pitting of a metal container containing a fluid under greater than atmospheric pressure, comprising a metal tube, said tube extending from the outside of said container to the interior thereof into contact with said fluid, the end of said tube which lies within said fluid being closed to exclude said fluid therefrom, means to measure the electrical resistance between spaced-apart points on said tube, and means connected to the end of said tube which is outside said container for indicating an increase in pressure within said tube.

4. The combination of claim 3 in which said tube is composed of the same material as said container.

5. Apparatus for determining the condition of the interior walls of a metal container containing a corrosive fluid, comprising a metal tube having a first end outside said container and a closed second end within said container and exposed to said fluid, means affixed to said first end for indicating an increase in pressure within said tube, electrical contacts connected in electrically conducting relationship to a plurality of spaced-apart points within said tube, means outside of said tube conductively connected to said contacts and adapted to measure the resistance between said contacts.

References Cited in the file of this patent
UNITED STATES PATENTS

| | | |
|---|---|---|
| 1,962,168 | Andrus | June 12, 1934 |
| 2,691,773 | Lichtenberger | Oct. 12, 1954 |
| 2,749,536 | Sperling | June 5, 1956 |
| 2,763,534 | Campbell | Sept. 18, 1956 |